United States Patent Office 3,552,071
Patented Jan. 5, 1971

3,552,071
PROCESS FOR POLISHING CRYSTALLINE
SILICON
Richard P. Albanese, Milford, and Glenn H. McIntyre, Jr., Pennington, N.J., assignors to Tizon Chemical Corporation, Flemington, N.J., a corporation of New Jersey
No Drawing. Filed Oct. 30, 1967, Ser. No. 679,248
Int. Cl. B24b 7/22, 3/14
U.S. Cl. 51—281                                                7 Claims

ABSTRACT OF THE DISCLOSURE

A process is provided for polishing crystalline silicon employing an aqueous polishing slurry containing from about 0.25 to about 50% of an alkaline earth metal hydroxide of which from about 0.05 to about 50% is undissolved and having a pH of at least 9. Examples of such polishing slurries include aqueous slurries of calcium hydroxide and strontium hydroxide.

The aqueous slurry of the alkaline earth metal hydroxide can be formed by mixing the alkaline earth metal hydroxide and water, or by forming the hydroxide in situ in water, e.g. by reacting an alkaline earth metal compound which reacts in an aqueous system with a base to produce the alkaline earth metal hydroxide.

---

This invention relates to a process for polishing crystalline silicon employing aqueous slurries of alkaline earth metal hydroxides having a pH of at least about 9 and containing from about 0.25 to about 50% of the hydroxide, of which from about 0.05 to about 50% is undissolved. Such aqueous slurries have been found to give a rapid polish of crystalline silicon to produce a smooth planar surface.

Monocrystalline silicon or single crystal silicon is now widely used in the manufacture of transistors and like equipment. The silicon crystal is prepared in ingot form. The ingots usually are rather large, of the order of ½ inch in diameter and 2 to 4½ inches long. The silicon is sliced from the ingot in very thin sheets having thicknesses of only several thousandths of an inch, and these sheets are then polished to produce as planar a surface as possible. It is important that the surface be absolutely plane and free from scratches, pits and like defects since the conductivity of silicon is in the plane along its surface, and any surface defects disadvantageously affect the conductivity, and therefore the effectiveness of the device in which the silicon is used.

The polishing compositions in general use comprise a polishing agent for silicon such as cerium oxide, aluminum oxide, red rouge (ferric oxide), white rouge (silicon dioxide) or zirconium oxide, slurried in water. The polish is applied to the silicon surface, and the polishing effected with a polishing pad. The polishing agents now in use are, however, rather slow, and a considerable polishing time is required to smooth the surface. Moreover, some of the polishing agents, such as aluminum oxide, have a tendency to produce scratches, which can be rather deep, and the longer the polishing time required, the greater the tendency of the surface to acquire polishing defects of this type.

Copending application Ser. No. 530,347, filed Feb. 28, 1966, now U.S. Pat. No. 3,328,141, dated June 27, 1967, to Lachapelle, relates to a process for polishing crystalline silicon wherein the polishing is carried out with an aqueous slurry of a polishing agent for silicon, and an alkaline compound in an amount to ensure a pH of at least about 10 in the presence of water. Such polishing agents for silicon include ferric oxide, zirconium oxide, aluminum oxide, and cerium oxide, and silicon dioxide.

It has now surprisingly been found that aqueous slurries of alkaline earth metal hydroxides, containing no conventional polishing agent for silicon, containing from about 0.25 to about 50% of alkaline earth metal hydroxide of which from about 0.05 to about 50% is undissolved and having a pH of at least about 9, are excellent polishing agents for crystalline silicon. In fact, such aqueous slurries having a pH of at least 9 have been found to rapidly polish crystalline silicon and produce a high quality planar surface, substantially free from polishing defects, such as pits and scratches, and are capable of polishing crystalline silicon at a substantially increased rate, compared to conventional silicon polishing agents, such as those set out above.

In accordance with the instant invention, a process also is provided for polishing crystalline silicon, employing slurries of alkaline earth metal hydroxides having a pH of at least 9, and containing from about 0.25 to about 50% of alkaline earth metal hydroxide of which from about 0.05 to about 50% is undissolved. The process is applicable to the polishing of any silicon surface, but is especially adapted for the polishing of crystalline silicon or silicon monocrystals.

Alkaline earth metal hydroxides which can be employed in the process of the instant invention are preferably calcium hydroxide and strontium hydroxide. Magnesium hydroxide and barium hydroxide also can be employed, as well as mixtures of any two or more of these hydroxides, having the required pH and concentration of dissolved and undissolved hydroxide.

The aqueous slurry contains the alkaline earth metal hydroxide in a concentration to ensure a pH of at least about 9. Accordingly, the slurry can contain from about 0.25 to about 50% and preferably from about 4 to about 10% of the hydroxide, of which at least 0.2% is dissolved and at least 0.05% undissolved. No significant advantages are obtained by employing slurries containing more than 50% by weight of the hydroxide, and, in fact, the polishing power of the slurry tends to decrease as the hydroxide concentration increases beyond 50%. There is no upper limit on pH, even though, usually, the upper pH limit that is obtainable is about 13.5, but theoretically it can be as high as 14. A pH within the range from about 12 to about 13 is preferred, for optimum polishing rate (silicon removal) and silicon surface characteristics.

The aqueous slurry of alkaline earth metal hydroxide polishes the crystalline silicon in part by chemically attacking the surface of the silicon (therefore, a portion of the hydroxide should be dissolved in the slurry), and in part by physically abrading its surface (therefore, a portion of the hydroxide should be insoluble in the slurry). It is this combination of the chemical and physical action in polishing the silicon which results in a rapid polishing, and the obtention of a high quality planar surface on the silicon, substantially free from polishing defects, such as pits and scratches.

For balanced chemical and physical polishing action, it is necessary to have a proper balance of dissolved and slurried undissolved alkaline earth metal hydroxide. Accordingly, from about 0.2 to about 50%, and preferably from about 1 to about 40%, of the hydroxide should be in solution in the slurry, and from about 0.05 to about 50% should be undissolved and slurried therein. If too little hydroxide is in solution, i.e., the slurry contains less than 0.2% of the total hydroxide dissolved therein, there is insufficient hydroxide in solution for the degree of chemical attack on the surface of the silicon required for good polishing. If there is too little hydroxide in undissolved, slurried solid form in the slurry, i.e. less than about 50% of the total hydroxide is slurried in the slurry, there is too little physical attack on the surface of the silicon, and the slurry will have a low silicon removal rate, and the surface of the silicon will remain uneven or pitted.

The aqueous slurry of the alkaline earth metal hydroxide can be formed by addition of an alkaline earth metal hydroxide or oxide to water. In addition, the oxide or hydroxide can be formed in situ in the aqueous slurry by reacting an alkaline earth metal compound that is more water-soluble than the oxide or hydroxide with a base in the presence of sufficient water to produce the alkaline earth metal oxide or hydroxide. The reaction product obtained can be employed as is, if it provides the required concentration of dissolved and undissolved alkaline earth metal hydroxide, has the required pH, and does not contain other materials as byproducts of the reaction which are deleterious to the polishing action on silicon. If necessary, the composition of the reaction product can be adjusted by conventional processing techniques to convert it to a useable form in the process of the invention, for example, by adding water to solid or concentrated compositions or by removing water from dilute compositions. For example, slurries of calcium hydroxide or strontium hydroxide can be prepared in situ by reacting alkaline earth metal halides, nitrates, nitrites, acetates, oxyhalides, formates, lactates, propionates, perchlorates, tartrates, citrates, cyanides, permanganates, salicylates, and thiosulfates, such as calcium chloride, calcium bromide, strontium chloride, strontium chlorate, strontium bromate, strontium cyanide, strontium bromide, calcium citrate, calcium acetate, strontium formate, barium chloride, barium nitrate, magnesium chloride, magnesium nitrate, or magnesium lactate with a basic material, such as an alkali metal hydroxide, for example, sodium hydroxide or potassium hydroxide, to produce the corresponding alkaline earth metal hydroxide in situ.

The particles of alkaline earth metal hydroxide slurried in the aqueous slurry should be in finely divided form, not in excess of about 20 microns in size, in order to ensure efficient physical polishing of the silicon surface. If the slurry contains particles of hydroxide larger than about 20 microns in size, it may tend to form scratches on the silicon surface polished therewith.

The polishing is carried out in the conventional way, usually at room temperature, by applying the aqueous slurried polishing composition to the silicon, and then polishing with a felt or other type of polishing pad. The so-called commercial bowl feed polisher is quite satisfactory, as are other commercially used or modified polishing or lapping machines. Water should be added from time to time, to compensate for evaporation loss and maintain a constant concentration of polishing composition, but this is not essential.

The following examples in the opinion of the inventor represent preferred embodiments of his invention.

A standardized polishing test was used to evaluate the polishing effectiveness in the examples. This test was carried out as follows. The test amount of polishing composition to be valuated was thoroughly mixed, by hand shaking, in distilled water, to form a slurry having a pH of between 12 and 13. A weighed silicon disk was then polished for 10 minutes, using a standard commercial bowl feed polisher. Slurry was added during the test at a constant rate, to maintain a fixed concentration of polishing agent on the surface being polished and on the polishing lap. At the end of the test, the silicon disk was weighed, and the total weight loss in milligrams (mg.) was employed as the measuring standard for polishing effectiveness of the composition. Slurries having a removal rate of at least 15 mg./10 min. silicon are considered to have a satisfactory polishing effectiveness.

EXAMPLE 1

Polishing slurries were prepared by mixing the amounts of calcium hydroxide in water shown in Table I. The polishing lap employed was Pellon PAN-W. Table I below sets out grams of water and calcium hydroxide in each slurry, percent calcium hydroxide in the slurry, percent of total calcium hydroxide dissolved in the slurry, pH, and polishing test results as a function of silicon removal rate (mg./10 min.) of each slurry.

The surface of the silicon in each case was examined for blemishes and scratches, and was found to be smooth and scratch-free.

TABLE I

| Calcium hydroxide, g. | Water, g. | Percent calcium hydroxide | Approximate percent of total calcium hydroxide dissolved | pH | Removal rate mg./10 min. |
|---|---|---|---|---|---|
| 1.5 | 300 | 0.5 | 37 | 12.1 | 22.9 |
| 3.0 | 300 | 1.0 | 18.5 | 12.1 | 22.9 |
| 15.0 | 285 | 5.0 | 3.5 | 12.6 | 26.1 |
| 30.0 | 270 | 10.0 | 1.67 | 12.7 | 25.6 |
| 60.0 | 240 | 20.0 | 0.84 | 12.7 | 27.5 |
| 100.0 | 200 | 33.0 | 0.37 | 12.7 | 25.3 |
| 125.0 | 175 | 42.0 | 0.26 | 12.7 | 21.9 |

In a series of controls, polishing slurries were prepared by mixing with water various amounts of alkaline compounds, for comparison with calcium hydroxide, namely, sodium hydroxide, sodium carbonate, calcium carbonate and aluminum hydroxide. These slurries were employed in the standardized test, using Pellon PAN-W as the polishing lap for polishing silicon. The test results are set out in Table II below.

TABLE II

| Alkaline compound, g. | Water, g. | Percent alkaline compound | Approximate percent of total alkaline compound dissolved | pH | Removal rate mg./10 min. |
|---|---|---|---|---|---|
| Control 1. Sodium carbonate | | | | | |
| 3.0 | 300 | 1.0 | 100 | 11.4 | 1.3 |
| 15.0 | 285 | 5.0 | 100 | 11.6 | 1.6 |
| 60.0 | 240 | 20.0 | 28 | 11.7 | 0.6 |
| 150.0 | 150 | 50.0 | 7 | 11.7 | 8.7 |
| Control 2. Sodium hydroxide | | | | | |
| 3.0 | 300 | 1.0 | 100 | 13.2 | 3.3 |
| 15.0 | 285 | 5.0 | 100 | 13.5 | 0.7 |
| 60.0 | 240 | 20.0 | 100 | 13.6 | 0.3 |
| Control 3. Calcium carbonate | | | | | |
| 3.0 | 300 | 1.0 | 0.001 | 9.4 | 1.0 |
| 15.0 | 285 | 5.0 | 0.02 | 9.4 | 2.1 |
| 60.0 | 240 | 20.0 | 0.05 | 9.4 | 3.3 |
| Control 4. Aluminum hydroxide | | | | | |
| 60.0 | 240 | 20.0 | 0.005 | 9.9 | 2.3 |

The data show that the polishing effectiveness of slurries containing calcium hydroxide (Example 1) was from about three to over twenty times greater than that of the control slurries, containing comparable amounts of other alkaline materials, such as sodium carbonate, sodium hydroxide, calcium carbonate or aluminum hydroxide. The surfaces of the silicon were examined, and found to be unsatisfactory, containing pits and other blemishes.

EXAMPLE 2

Another series of polishing slurries was prepared, mixing various amounts of calcium hydroxide in water. The polishing lap employed was PRE (Geoscience Instruments).

Table II below sets out grams of water and calcium hydroxide in each slurry, percent calcium hydroxide in each slurry, percent total calcium hydroxide dissolved, pH, and polishing test results as a function of silicon removal rate (mg./10 min.) of each slurry.

TABLE III

| Calcium hydroxide, g. | Water, g. | Percent calcium hydroxide | Approximate percent of total calcium hydroxide dissolved | pH | Removal rate mg./10 min. |
|---|---|---|---|---|---|
| 3.0 | 300 | 1.0 | 18.5 | 12.6 | 26.0 |
| 15.0 | 285 | 5.0 | 3.5 | 12.7 | 31.5 |
| 60.0 | 240 | 20.0 | 0.84 | 12.7 | 32.7 |

The above data show that each of the slurries had a satisfactory polishing effectiveness. The surface of the silicon in each case was examined for blemishes and scratches, and was found to be smooth and scratch-free.

EXAMPLE 3

Another series of polishing slurries was prepared, mixing various amounts of calcium hydroxide in water. The polishing lap employed was canvas drill cloth.

Table IV below sets out grams of water and calcium hydroxide in each slurry, percent calcium hydroxide present, percent of total calcium hydroxide dissolved, pH, and the polishing test results.

TABLE IV

| Calcium hydroxide, g. | Water, g. | Percent calcium hydroxide | Approximate percent of total calcium hydroxide dissolved | pH | Removal rate, mg./10 min. |
|---|---|---|---|---|---|
| 3.0 | 300 | 1.0 | 18.5 | 12.6 | 19.7 |
| 15.0 | 285 | 5.0 | 3.5 | 12.7 | 23.1 |
| 30.0 | 270 | 10.0 | 1.67 | 12.7 | 24.8 |
| 60.0 | 240 | 20.0 | 0.84 | 12.7 | 21.1 |

The above data show that each of the slurries had a satisfactory polishing effectiveness. The surface of the silicon in each case was examined for blemishes and scratches, and was found to be smooth and scratch-free.

EXAMPLE 4

A polishing slurry was prepared by admixing 5.4 g. sodium hydroxide and 10.0 g. calcium chloride ($CaCl_2 \cdot 2H_2O$) in 300 g. of water, thereby forming calcium hydroxide in situ in the slurry. The slurry had a pH of about 12.5.

The slurry was employed to polish a silicon surface, using the standardized test procedure with a Pellon PAN–W polishing lap, and was found to have a polishing effectiveness of 31.3. The surface of the silicon was examined for blemishes and scratches, and was found to be smooth and scratch-free.

EXAMPLE 5

A polishing slurry was prepared, mixing various amounts of strontium chloride and sodium hydroxide in water, thereby forming strontium hydroxide in situ in the slurry.

Table V below sets out the composition of each slurry, the pH thereof, and the removal rate.

TABLE V

| Water, g. | Strontium chloride, g. | Sodium hydroxide, g. | pH | Removal rate, mg./10 min. |
|---|---|---|---|---|
| 289.4 | 6.6 | 4.0 | 13 | 21.7 |
| 282.4 | 11.0 | 6.6 | 13 | 22.3 |

The above data show that each of the slurries containing strontium hydroxide formed in situ therein had a satisfactory polishing effectiveness. The surface of the silicon in each case was examined for blemishes and scratches, and was found to be smooth and scratch-free.

Having regard to the foregoing disclosure, the following is claimed as the inventive and patentably embodiments thereof:

1. A process for polishing crystalline silicon which comprises applying to the surface of the silicon a composition consisting essentially of an aqueous slurry containing an amount to provide a pH of at least about 9 and within the range from about 0.25 to about 50% by weight of an alkaline earth metal hydroxide, of which from about 0.2 to about 50% is dissolved in the slurry, and from about 0.05 to about 50% is undissolved and slurried therein, and then polishing the silicon surface therewith.

2. A process in accordance with claim 1, in which the alkaline earth metal hydroxide is used in an amount to maintain a pH within the range from about 12 to about 13.5.

3. A process in accordance with claim 1, wherein the alkaline earth metal hydroxide is calcium hydroxide.

4. A process in accordance with claim 1, wherein the alkaline earth metal hydroxide is strontium hydroxide.

5. A process in accordance with claim 1, wherein the alkaline earth metal hydroxide is formed by reacting an alkaline earth metal compound with a base in the presence of water, to form the alkaline earth metal hydroxide in situ.

6. A process in accordance with claim 5, wherein the alkaline earth metal compound is calcium chloride, and the base is sodium hydroxide, and these are reacted in an aqueous medium to form a slurry of calcium hydroxide.

7. A process in accordance with claim 5, wherein the alkaline earth metal compound is strontium chloride and the base is sodium hydroxide, and these are reacted in an aqueous medium to form a slurry of strontium hydroxide.

References Cited

UNITED STATES PATENTS

| | | | |
|---|---|---|---|
| 1,239,256 | 9/1917 | Carson | 106—118 |
| 1,580,710 | 4/1926 | Chubbuck | 23—188 |
| 1,613,341 | 1/1927 | Carson | 23—188 |
| 1,634,424 | 7/1927 | Hunter | 23—188 |
| 1,720,026 | 7/1929 | Barton | 23—188 |
| 2,013,811 | 9/1935 | Smith | 106—118 |
| 2,784,062 | 3/1957 | Locke et al. | 23—188 |
| 2,894,820 | 7/1959 | Rikard et al. | 23—188 |
| 3,328,141 | 6/1967 | Lachapelle | 51—308 |
| 3,429,080 | 2/1969 | Lachapelle | 51—309 |

DONALD J. ARNOLD, Primary Examiner

U.S. Cl. X.R.

51—293, 307